(12) United States Patent
Kawai (10) Patent No.: US 9,951,892 B2
(45) Date of Patent: Apr. 24, 2018

(54) POLYAMIDE RESIN COMPOSITION, METHOD FOR PRODUCING THE SAME AND REFRIGERANT TRANSPORTING HOSE

(75) Inventor: Atsushi Kawai, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 648 days.

(21) Appl. No.: 14/000,457

(22) PCT Filed: Feb. 22, 2012

(86) PCT No.: PCT/JP2012/054270
§ 371 (c)(1),
(2), (4) Date: Aug. 20, 2013

(87) PCT Pub. No.: WO2012/115147
PCT Pub. Date: Aug. 30, 2012

(65) Prior Publication Data
US 2013/0327434 A1    Dec. 12, 2013

(30) Foreign Application Priority Data
Feb. 22, 2011    (JP) ................. 2011-036128

(51) Int. Cl.
*C08L 77/00*    (2006.01)
*F16L 11/08*    (2006.01)
(Continued)

(52) U.S. Cl.
CPC .............. *F16L 11/081* (2013.01); *B32B 1/08* (2013.01); *B32B 27/12* (2013.01); *B32B 27/18* (2013.01);
(Continued)

(58) Field of Classification Search
CPC . B32B 2270/00; B32B 27/34; B32B 2597/00; B32B 1/08; B32B 27/12;
(Continued)

(56) References Cited

U.S. PATENT DOCUMENTS 5,248,720 A * 9/1993 Deguchi ................. C08K 3/34
                                                524/444
5,488,974 A * 2/1996 Shiota ................. F16L 11/081
                                                138/124
(Continued)

FOREIGN PATENT DOCUMENTS

JP    63-170460 A    7/1988
JP    2000-120944 A    4/2000
(Continued)

OTHER PUBLICATIONS

Notification of First Office Action dated Aug. 21, 2014 in corresponding Chinese Patent Application No. 201280019741.3 with translation.
(Continued)

*Primary Examiner* — Charles P Cheyney
(74) *Attorney, Agent, or Firm* — Sughrue Mion, PLLC (57) ABSTRACT

A polyamide resin composition is provided which contains an anti-aging agent together with a deterioration inhibitor, such as a metal compound or a silica-based inorganic compound, for preventing deterioration caused by, for example, an acid component or a halogen component contained in a refrigerant or an oil, and which satisfactorily produces an anti-aging effect expected by adding the anti-aging agent. For producing a polyamide resin composition containing an (a) polyamide resin, a (b) polyolefin-based elastomer, at least one (c) deterioration inhibitor selected from the group consisting of hydroxides, oxides and basic salts of divalent or trivalent metals, and silica-based inorganic compounds, and a (d) anti-aging agent, a mixture prepared by mixing and kneading the (c) deterioration inhibitor and (b) polyolefin-based elastomer and a mixture prepared by mixing and kneading the (a) polyamide resin and the (d) anti-aging agent are mixed and kneaded.

6 Claims, 1 Drawing Sheet

(51) Int. Cl.
*B32B 1/08* (2006.01)
*B32B 27/12* (2006.01)
*B32B 27/18* (2006.01)
*B32B 27/32* (2006.01)
*B32B 27/34* (2006.01)
*C08J 3/20* (2006.01)
*C08K 3/22* (2006.01)
*C08L 77/02* (2006.01)
*C08L 77/06* (2006.01)
*F16L 11/04* (2006.01)
*C08L 51/06* (2006.01)

(52) U.S. Cl.
CPC .............. *B32B 27/32* (2013.01); *B32B 27/34* (2013.01); *C08J 3/20* (2013.01); *C08J 3/203* (2013.01); *C08K 3/22* (2013.01); *C08L 77/00* (2013.01); *C08L 77/02* (2013.01); *C08L 77/06* (2013.01); *F16L 11/082* (2013.01); *B32B 2250/05* (2013.01); *B32B 2264/102* (2013.01); *B32B 2264/104* (2013.01); *B32B 2264/12* (2013.01); *B32B 2270/00* (2013.01); *B32B 2274/00* (2013.01); *B32B 2307/714* (2013.01); *B32B 2597/00* (2013.01); *B32B 2605/00* (2013.01); *C08J 2377/00* (2013.01); *C08J 2423/00* (2013.01); *C08L 51/06* (2013.01); *F16L 2011/047* (2013.01); *Y10T 428/1379* (2015.01)

(58) Field of Classification Search
CPC ......... B32B 27/18; B32B 27/32; C08L 77/00; C08L 77/02; C08L 77/06; C08K 2003/2217; C08K 2003/2224; C08K 2003/2227; C08K 3/0025; C08K 3/0041; C08K 3/16
USPC ........ 138/137, 124–127, 140, 141; 428/35.7, 428/36.6; 524/401, 413, 424, 436, 444; 525/426
See application file for complete search history.

(56) References Cited

U.S. PATENT DOCUMENTS

| | | | | |
|---|---|---|---|---|
| 6,423,776 | B1* | 7/2002 | Akkapeddi | B65D 81/267 524/394 |
| 7,902,287 | B2* | 3/2011 | Grant | C08J 5/18 508/202 |
| 8,541,082 | B2* | 9/2013 | Inaba | B32B 1/08 138/141 |
| 8,778,472 | B2* | 7/2014 | Kawai | C08K 3/22 138/137 |
| 2004/0040609 | A1* | 3/2004 | Oishi | B32B 1/08 138/141 |
| 2008/0262133 | A1* | 10/2008 | Eibeck | C08L 77/00 524/186 |

FOREIGN PATENT DOCUMENTS

| | | |
|---|---|---|
| JP | 2007-015245 A | 1/2007 |
| JP | 2010-091051 A | 4/2010 |
| JP | 2010-249316 A | 11/2010 |
| JP | 2010-260258 A | 11/2010 |
| JP | 2011-006680 A | 1/2011 |
| JP | 2011-011542 A | 1/2011 |
| WO | WO 2010110419 A1 * | 9/2010 ......... B60H 1/00571 |

OTHER PUBLICATIONS

International Search Report for PCT/JP2012/054270, dated May 1, 2012.
Communication from the Japanese Patent Office dated Oct. 14, 2014 in Japanese Application No. 2013-501094.
Communication dated Oct. 13, 2015 from the European Patent Office in counterpart application No. 12749075.3.

* cited by examiner

POLYAMIDE RESIN COMPOSITION, METHOD FOR PRODUCING THE SAME AND REFRIGERANT TRANSPORTING HOSE

CROSS REFERENCE TO RELATED APPLICATIONS

This application is a National Stage of International Application No. PCT/JP2012/054270 filed Feb. 22, 2012, claiming priority based on Japanese Patent Application No. 2011-036128 filed Feb. 22, 2011, the contents of all of which are incorporated herein by reference in their entirety.

FIELD OF INVENTION

The present invention relates to a polyamide resin composition suitable as a resin composition used for forming a gas barrier layer of a refrigerant transporting hose, a method for producing the same, and a refrigerant transporting hose including a gas barrier layer made of the polyamide resin composition.

BACKGROUND OF INVENTION

Automotive air conditioners have used chlorofluorocarbon gases, such as HFC-134a (R-134a), as refrigerants.

In order to improve ride comfort, automotive air-conditioning piping uses highly vibration-absorbing rubber hoses. Japanese Patent Publication 2007-15245A (Patent Literature 1) discloses a rubber hose that includes an innermost layer of a polyamide resin superior in terms of gas barrier property and vibration durability such as impulse resistance so as to prevent the refrigerant from leaking. The rubber hose further includes a rubber inner tube layer on the polyamide resin layer, a reinforcing yarn layer made of an organic fiber, such as PET, on the rubber inner tube layer, and a weather-resistant EPDM rubber layer on the reinforcing yarn layer.

Japanese Patent Publication 2000-120944A (Patent Literature 2) discloses a refrigerant-permeation resistant flexible refrigerant transporting hose that includes an innermost gas barrier layer made of a polyamide resin containing a polyolefin-based elastomer as a flexibility-imparting agent.

A polyamide resin may be degraded by a chlorofluorocarbon used as a refrigerant or an oil from a compressor. Even if a polyolefin-based elastomer is added to the polyamide resin, such degradation may not fully be prevented.

Known refrigerant transporting hoses do not, therefore, exhibit sufficient durability in some cases.

For example, if a trace amount of an acid component is present in an air conditioning system, the acid component may seriously degrade the polyamide resin composition to the extent that the hose cannot be used. The acid component can be an extreme pressure agent contained in a compressor oil enclosed together with a refrigerant. Therefore, some of the known refrigerant transporting hoses cannot exhibit sufficient durability in practice and may become unusable, depending on environmental conditions and the type of oil used in the air conditioning system.

Patent Literature 3 (Japanese Patent Publication 2010-249316A) discloses a refrigerant transporting hose whose durability has been enhanced by preventing the gas barrier layer made of a polyamide resin composition from being degraded by a refrigerant or a compressor oil. In the refrigerant transporting hose of Patent Literature 3, the polyamide resin composition for forming the gas barrier layer contains at least one metal compound selected from the group consisting of hydroxides, oxides and carbonates of divalent or trivalent metals in a predetermined proportion.

Since the polyamide resin composition of Patent Literature 3 contains such a metal compound, deterioration of the gas barrier layer made of the polyamide resin composition by a refrigerant or a compressor oil is suppressed or prevented (suppress or prevent is hereinafter simply expressed as "prevent") effectively, and the durability of the refrigerant transporting hose is enhanced.

It is not clear in detail how the above-mentioned metal compounds prevent the deterioration of the polyamide resin by a refrigerant or a compressor oil. It is, however, supposed that the metal compound in the polyamide resin composition acts as an acid acceptor, a halogen acceptor or the like to trap acid components, halogen components and other degrading components contained in the refrigerant or the oil and is thus effective in preventing the deterioration of the polyamide resin.

The gas barrier layer of a refrigerant transporting hose, made of the gas barrier layer-forming polyamide resin composition of Patent Literature 3 containing one or more of the above-mentioned metal compounds is prevented from being deteriorated by a refrigerant or a compressor oil. However, the above-mentioned metal compounds are difficult to disperse uniformly in a polyamide resin. In a polyamide resin composition containing a relatively large amount of a metal compound to enhance durability, the dispersibility of the metal compound is not good in the polyamide resin composition, and a nonuniform phase portion of the metal compound may be formed in the polyamide resin composition. Accordingly, in a refrigerant transporting hose including a gas barrier layer made of such a composition, breakage can occur from such a nonuniform phase portion. Thus, the resin can be broken by a fatigue test such as repetitive pressurizing test (impulse test) and may not exhibit satisfactory performance. More specifically, if the metal compound is not sufficiently dispersed in the polyamide resin composition, the state of the surface portion (surface condition) of the gas barrier layer, which is a thin film formed by extruding the polyamide resin composition, becomes worse and the impulse resistance of the refrigerant transporting hose may be degraded.

Patent Literature 4 (Japanese Patent Publication 2011-6680A) discloses a method for producing a polyamide resin composition, in which the dispersibility of the metal compound in the polyamide resin composition of Patent Literature 3 is enhanced. The method of Patent Literature 4 produces a polyamide resin composition containing a polyamide resin, a polyolefin-based elastomer, at least one metal compound selected from the group consisting of hydroxides, oxides and carbonates of divalent or trivalent metals. In this method, the metal compound and the polyolefin-based elastomer are mixed and kneaded, and the resulting mixture is mixed and kneaded with the polyamide resin.

As disclosed in Patent Literature 4, in the method for producing the polyamide resin composition containing a polyamide resin, a polyolefin-based elastomer, and any of the above-mentioned metal compounds, the metal compound is uniformly dispersed in the resin composition by first mixing and kneading the polyolefin-based elastomer and the metal compound, and then mixing and kneading the polyamide resin with the resulting mixture. Thus, the impulse resistance of the refrigerant transporting hose is enhanced.

The above-mentioned metal compounds are easy to disperse uniformly in a polyolefin-based elastomer. Accordingly, as disclosed in Patent Literature 4, the metal compound is uniformly dispersed in the resin composition by first mixing and kneading the metal compound with the polyolefin-based elastomer. Consequently, the occurrence of a defect portion that exhibits a poor surface condition and can cause breakage is prevented.

The deterioration of the polyamide resin composition of a refrigerant transporting hose results mainly from degradation of the polyamide resin by acid components. The acid component that will degrade the polyamide resin composition may penetrate into the polyolefin-based elastomer phase as well as the polyamide resin phase, and, in some cases, may reach the polyamide resin phase after penetrating the polyolefin-based elastomer phase. The metal compound dispersed in the polyolefin-based elastomer phase can trap the acidic component penetrating the polyolefin-based elastomer phase, thus preventing the deterioration of the polyamide resin effectively.

In the polyamide resin composition of Patent Literature 4, the metal compound is dispersed mainly in the polyolefin-based elastomer phase. In the gas barrier layer made of the polyamide resin composition, the metal compound traps the acid component penetrating the polyolefin-based elastomer phase, thus preventing the deterioration of the polyamide resin.

In order that a polyamide resin composition for the gas barrier layer of a refrigerant transporting hose ensures such a high heat resistance and durability that the polyamide resin composition can withstand high-temperature and high pressure conditions, an anti-aging agent such as copper iodide or potassium iodide may be added to the polyamide resin composition (Patent Literature 5).

The present inventors, however, have found that a polyamide resin composition prepared by further adding an ant-aging agent to a polyamide resin composition containing any of the metal compounds disclosed in Patent Literature 3 has to be improved more than the case where an ant-aging agent is added to a polyamide resin composition not containing a metal compound.

Thus, there has not been provided a polyamide resin composition exhibiting both a heat resistance sufficient to withstand high temperature and high pressure conditions and a durability against deterioration by acid components or moisture derived from refrigerants or compressor oils.

CITATION LIST

Patent Literature

Patent Literature 1: Japanese Patent Publication 2007-15245A
Patent Literature 2: Japanese Patent Publication 2000-120944A
Patent Literature 3: Japanese Patent Publication 2010-249316A
Patent Literature 4: Japanese Patent Publication 2011-6680A
Patent Literature 5: Japanese Patent Publication 2010-91051A

OBJECT AND SUMMARY OF INVENTION

It is an object of the invention to provide a polyamide resin composition that contains an anti-aging agent together with one or more of the metal compounds disclosed in Patent Literature 3 added for preventing deterioration caused by an acid component or a halogen component derived from a refrigerant or an oil, and that satisfactorily exhibits the anti-aging effect of the anti-aging agent.

It is another object of the invention to provide a highly durable refrigerant transporting hose including a gas barrier layer made of the polyamide resin composition.

As a result of an intensive research, the present inventors have found that one of the reasons why a polyamide resin composition prepared by adding an anti-aging agent to a polyamide resin composition containing a deterioration inhibitor such as the above-described metal compounds does not sufficiently produce an effect expected by adding the anti-aging agent is that the anti-aging effect of the anti-aging agent is inhibited by the deterioration inhibitor trapping the anti-aging agent. The present inventors have also found that such inhibition of the anti-aging effect of the anti-aging agent can be prevented by mixing and kneading a mixture prepared by mixing and kneading a polyolefin-based elastomer and a deterioration inhibitor and a mixture prepared by mixing and kneading a polyamide resin and an anti-aging agent.

The present invention has been accomplished based on these findings and the summary of the invention is as follows.

A method for producing a polyamide resin composition according to a first aspect produces a polyamide resin composition containing an (a) polyamide resin, a (b) polyolefin-based elastomer, at least one (c) deterioration inhibitor selected from the group consisting of hydroxides, oxides and basic salts of divalent or trivalent metals and silica-based inorganic compounds, and a (d) anti-aging agent. The method includes a mixing and kneading step (A) of mixing and kneading the (c) deterioration inhibitor and the (b) polyolefin-based elastomer, a mixing and kneading step (B) of mixing and kneading the (a) polyamide resin and the (d) anti-aging agent, and a mixing and kneading step (C) of mixing and kneading the mixture prepared in the mixing and kneading step (A) and the mixture prepared in the mixing and kneading step (B).

A method for producing a polyamide resin composition according to a second aspect is the method of the first aspect in which the proportion of the (d) anti-aging agent is 0.01% to 1% by weight relative to the polymer component in the polyamide resin.

A method for producing a polyamide resin composition according to a third aspect is the method of the first or the second aspect in which the (d) anti-aging agent is copper iodide or potassium iodide, or contains copper iodide and potassium iodide.

A method for producing a polyamide resin composition according to a fourth aspect is the method of any one of the first to third aspects in which the proportion of the (c) deterioration inhibitor is 1% to 15% by weight relative to the polymer component in the polyamide resin composition.

A method for producing a polyamide resin composition according to a fifth aspect is the method of any one of the first to the fourth aspects in which the (c) deterioration inhibitor is hydrotalcite.

A method for producing a polyamide resin composition according to a sixth aspect is the method of any one of the first to fifth aspects in which the (b) polyolefin-based elastomer content in the polyamide resin composition is 10% to 45% by weight relative to the total weight of the polyamide resin composition.

A method for producing a polyamide resin composition according to a seventh aspect is the method of any one of the first to sixth aspects in which at least part of the (b) polyolefin-based elastomer is modified with an acid.

A polyamide resin composition according to an eighth aspect is produced by the method for producing a polyamide resin composition as set forth in any one of the first to seventh aspects.

A polyamide resin composition according to a ninth aspect is the polyamide resin composition of the eighth aspect in which the polyamide resin composition is used for forming a gas barrier layer of a refrigerant transporting hose.

A refrigerant transporting hose according to a tenth aspect includes a gas barrier layer made of the polyamide resin composition as set forth in the eighth aspect.

A refrigerant transporting hose according to an eleventh aspect is the refrigerant transporting hole of the tenth aspect. The refrigerant transporting hose further includes a reinforcing layer made of a reinforcing yarn and a rubber sheath layer around the outer periphery of the gas barrier layer.

Advantageous Effects of Invention

According to the method for producing a polyamide resin composition of the present invention, a polyamide resin composition is produced which includes (a) polyamide resin, (b) polyolefin-based elastomer, at least one (c) deterioration inhibitor selected from the group consisting of hydroxides, oxides and basic salts of divalent or trivalent metals and silica-based inorganic compounds, and (d) anti-aging agent. In the methods, the (a) polyamide resin and the (d) anti-aging agent are mixed and kneaded while the (c) deterioration inhibitor and the (b) polyolefin-based elastomer are mixed and kneaded, and then the resulting mixtures are mixed and kneaded. This process increases the dispersibility of the (c) deterioration inhibitor and suppresses inhibition act of the (c) deterioration inhibitor on the (d) anti-aging agent. Consequently, a polyamide resin composition is produced which produces both an effect of the (c) deterioration inhibitor to prevent deterioration caused by an acid component or moisture derived from a refrigerant or a compressor oil and an effect of the (d) anti-aging agent to impart a heat resistance sufficient to withstand high temperature and high pressure conditions.

In the present invention, the proportion of the (d) anti-aging agent is preferably 0.01% to 1% by weight relative to the polymer component in the polyamide resin composition, and, preferably, the (d) anti-aging agent is copper iodide or potassium, or contains copper iodide and potassium iodide.

In the polyamide resin composition of the present invention, the proportion of the (c) deterioration inhibitor is preferably 1% to 15% by weight relative to the polymer component, and the (c) deterioration inhibitor is preferably hydrotalcite.

Preferably, the (b) polyolefin-based elastomer content in the polyamide resin composition is 10% to 45% by weight, from the viewpoint of flexibility and durability.

The polyolefin-based elastomer may be modified at least in part with an acid to enhance the compatibility with the polyamide resin.

The polyamide resin composition of the present invention is produced by the above method for producing a polyamide resin composition, and can be suitably used for forming a gas barrier layer of a refrigerant transporting hose because of its superior heat resistance, gas-barrier property and durability.

The refrigerant transporting hose of the present invention includes a gas barrier layer made of the polyamide resin composition of the present invention, and has a heat resistance sufficient to withstand high temperature and high pressure conditions. In addition, the gas barrier layer is hardly degraded by refrigerants or compressor oils, and the refrigerant transporting hose is thus superior in terms of durability.

Preferably, the refrigerant transporting hose is provided with a reinforcing layer made of a reinforcing yarn and a rubber sheath layer particularly around the outer periphery of the gas barrier layer.

DESCRIPTION OF EMBODIMENTS

Embodiments of the present invention will now be described in detail.

[Polyamide Resin Composition and Method for Producing the Same]

First, a method of the present invention for producing a polyamide resin composition and a polyamide resin composition of the present invention produced by this method will be described.

The method for producing a polyamide resin composition of the present invention produces a polyamide resin composition containing an (a) polyamide resin, a (b) polyolefin-based elastomer, at least one (c) deterioration inhibitor selected from the group consisting of hydroxides, oxides and basic salts of divalent or trivalent metals, and silica-based inorganic compounds, and an (d) anti-aging agent. The method includes a mixing and kneading step (A) of mixing and kneading the (c) deterioration inhibitor and the (b) polyolefin-based elastomer, a mixing and kneading step (B) of mixing and kneading the (a) polyamide resin and the (d) anti-aging agent, and a mixing and kneading step (C) of mixing and kneading the mixture prepared in the mixing and kneading step (A) and the mixture prepared in the mixing and kneading step (B).

<(a) Polyamide Resin>

The polyamide resin used in the present invention mainly contains an amino acid, a lactam, or a diamine and a dicarboxylic acid. Examples of these components include lactams, such as $\epsilon$-caprolactam, enantlactam, and $\omega$-laurolactam; amino acids, such as $\epsilon$-aminocaproic acid, 11-aminoundecanic acid, and 12-aminododecanic acid; diamines, such as tetramethylenediamine, hexamethylenediamine, undecamethylenediamine, dodecamethylenediamine, 2,2,4/2,4,4-trimethylhexamethylenediamine, 5-methylnonamethylenediamine, m-xylylenediamine, p-xylylenediamine, 1,3-bis-aminomethylcyclohexane, 1,4-bis-aminomethylcyclohexane, bis-p-aminocyclohexylmethane, bis-p-aminocyclohexylpropane, and isophoronediamine; and dicarboxylic acids, such as adipic acid, suberic acid, azelaic acid, sebacic acid, dodecanedioic acid, 1,4-cyclohexanedicarboxylic acid, 1,3-cyclohexanedicarboxylic acid, terephthalic acid, isophthalic acid, naphthalene dicarboxylic acid, and dimer acids. These components are subjected to polymerization singly or in the form of a mixture of at least two components, and the resulting polyamide resin may be a homopolymer or a copolymer.

Polyamide resins that can be suitably used in the present invention include polycaproamide (nylon 6), polyhexamethylene adipamide (nylon 66), polytetramethylene adipamide (nylon 46), polyhexamethylene sebacamide (nylon 610), polyundecaneamide (nylon 11), polydodecaneamide (nylon 12), polyhexamethylene adipamide/hexamethyleneterephthalamide copolymer (nylon 66/6T), and polycaproamide/polyhexamethylene adipamide copolymer (nylon 6/66). These polyamide resins may be used singly or in combination.

The polymerization degree of the polyamide is not particularly limited, and can be any of the polyamides having a relative viscosity in the range of 1.5 to 5.0 at 25° C. in 1% by weight sulfuric acid solution (this relative viscosity hereinafter may be simply referred to as "relative viscosity"). The concentration of the terminal group of the polyamide resin may be adjusted by adding at least one of the compounds having a terminal group containing a monocarboxylic acid and/or a dicarboxylic acid or containing a monoamine and/or a diamine to a polyamide in a desired stage.

<(b) Polyolefin-Based Elastomer>

The polyamide resin composition of the present invention contains a polyolefin-based elastomer. By adding a polyolefin-based elastomer, flexibility and durability can be imparted to the gas barrier layer made of the polyamide resin composition.

Examples of olefin-based elastomers include ethylene-butene copolymer, EPR (ethylene-propylene copolymer), modified ethylene-butene copolymer, EEA (ethylene-ethyl acrylate copolymer), modified EEA, modified EPR, modified EPDM (ethylene-propylene-diene ternary copolymer), ionomer, α-olefin copolymer, modified IR (isoprene rubber), modified SEBS (styrene-ethylene-butylene-styrene copolymer), halogenated isobutylene-p-methylstyrene copolymer, ethylene-acrylic acid modified compound, ethylene-vinyl acetate copolymer and its acid-modified compound, and mixtures mainly containing these elastomers. These may be used singly or in combination.

In particular, the polyolefin-based elastomer is preferably a compound modified with an acid anhydride such as maleic anhydride, an alkyl acrylate such as glycidyl methacrylate, an epoxy or a modified form thereof, from the viewpoint of forming a fine alloy structure including a polyamide resin as the base polymer.

As for the polyolefin-based elastomer content in the polyamide resin composition of the present invention, if it is too low, the flexibility or the durability of the polyamide resin composition cannot sufficiently be improved in spite of adding the polyolefin-based elastomer. If it is too high, the gas barrier property is reduced. Accordingly, the polyolefin-based elastomer content in the polyamide resin composition is preferably 10% to 45% by weight, and is particularly 20% to 40% by weight. If the polyolefin-based elastomer content in the polyamide resin composition is too high, the sea phase and the island phase are reversed in the sea-island structure described below. This undesirably reduces the gas barrier property significantly.

The use of a modified elastomer such as an acid-modified elastomer as the polyolefin-based elastomer allows mixing and kneading (dispersion) operation to be performed at a low specific energy without requiring an advanced mixing and kneading technique. However, if the polyolefin-based elastomer content is high, the resin gelates. Consequently a poor appearance (fisheye) such as rough surface occurs when the resin is extruded. Accordingly, if a modified elastomer is used as the polyolefin-based elastomer, the modified elastomer content in the polyamide resin composition is preferably 20% by weight or less, such as 5% to 20% by weight.

In the present invention, particularly, it is preferable that an acid-modified elastomer account for 40% to 100% by weight of the polyolefin-based elastomer in the polyamide resin composition.

From the viewpoint of making the polyamide resin composition and the polyolefin-based elastomer compatible, that is, of dispersing them sufficiently in each other, it is preferable that at least part of the elastomer be modified with maleic anhydride or the like. The average acid value (acid modification ratio) of all the elastomers used to prepare a good dispersion is preferably 0.8 mg-$CH_3ONa$/g or more.

The higher the acid value of the elastomer, the better the dispersion state. However, as the acid value increases, the viscosity of the polyamide resin composition is increased and its formability is degraded. Accordingly, the acid value of the elastomer is preferably as low as possible within the range in which a good dispersion state can be established from the viewpoint of alleviating the viscosity increase resulting from the acid value increase. The average acid value of all the elastomers used is preferably 7.5 mg-$CH_3ONa$/g or less.

If the elastomers used include a modified elastomer having a high acid value while the average acid value of the elastomers is constant, foreign matter in a gel state that may be produced probably by a local overreaction is undesirably produced during extrusion, even if the average acid value is reduced by mixing the modified elastomer and an unmodified elastomer. Accordingly, the acid value of the modified elastomer to be used is preferably 15.0 mg-$CH_3ONa$/g or less.

Although the flexibility and the durability are improved by adding a polyolefin-based elastomer to the polyamide resin composition, deterioration in gas barrier property is inevitable. However, by forming a fine alloy structure of the polyamide resin and the elastomer, particularly by forming a structure in which elastomer island phases are dispersed in a polyamide sea phase while the polyamide resin is dispersed in a dotted manner in the elastomer island phases, the deterioration in gas barrier property caused by adding an elastomer can be advantageously suppressed.

In particular, the ratio of the polyamide resin phase existing in the form of scattered dots in the elastomer island phase to the polyamide resin (total of the polyamide resin forming the sea phase and the polyamide resin phase existing in the form of scattered dots in the elastomer island phase) (this ratio hereinafter referred to as "dot dispersion ratio") is preferably about 5% to 40% by weight. If this ratio is less than 5% by weight, the effect of the polyamide resin phase existing in the form of scattered dots in the elastomer island phase cannot be produced as expected. In contrast, if it is more than 40% by weight, the sea phase of the polyamide resin may be reduced excessively to the extent that the gas barrier property can be undesirably degraded.

The size of the elastomer island phases is preferably about 0.1 to 3.0 μm, and the size of the polyamide resin phases in the elastomer island phases is preferably about 0.5 to 2.0 μm.

<(c) Deterioration Inhibitor>

The deterioration inhibitor contained in the polyamide resin composition of the present invention is selected from the group consisting of hydroxides, oxides and carbonates and other basic salts of divalent or trivalent metals, and silica-based inorganic compounds.

Exemplary divalent and trivalent metals include divalent metals, such as magnesium, iron, zinc, calcium, nickel, cobalt, and copper; and trivalent metals, such as aluminum, iron, and manganese.

Examples of hydroxides, oxides and carbonates and other basic salts of these metals include hydrotalcite, magnesium oxide, calcium hydroxide, zinc oxide, aluminum oxide, magnesium carbonate, magnesium hydroxide, aluminum hydroxide, calcium oxide, and calcium carbonate.

The silica-based inorganic compound is not particularly limited and can be that conventionally used in rubber compositions and resin compositions. More specifically, silica-based inorganic compounds include silica, hydrous amorphous silicon dioxide, hydrous aluminum silicate, calcium silicate, magnesium silicate, silica sand, silica rock powder, kaolinite, montmorillonite, saponite, muscovite, palagonite, and silica gel. Among these, preferred are silica, hydrous amorphous silicon dioxide, hydrous aluminum silicate, calcium silicate, and magnesium silicate.

These (c) deterioration inhibitors may be used singly or in a desired combination with a desired proportion.

Among these (c) deterioration inhibitors, hydrotalcite is preferred because it is expected to have a high acid-receiving effect.

Hydrotalcite is one of the clay minerals produced in nature, and is a complex hydroxide expressed by the following general formula (I):

$$M^1{}_{8-x}M^2{}_x(OH)_{16}CO_2 \cdot nH_2O \quad (I)$$

In formula (I), $M^1$ represents $Mg^{2+}$, $Fe^{2+}$, $Zn^{2+}$, $Ca^{2+}$, $Li^{2+}$, $Ni^{2+}$, $Co^{2+}$, $Cu^{2+}$, etc., $M^2$ represents $Al^{3+}$, $Fe^{3+}$, $Mn^{3+}$, etc., and relationships $5 \leq x \leq 2$ and $n \geq 0$ hold true.

Exemplary hydrotalcites, in a form containing crystal water, include $Mg_{4.5}Al_2(OH)_{13}CO_3 \cdot 3.5H_2O$, $Mg_{4.5}Al_2(OH)_{13}CO_3$, $Mg_4Al_2(OH)_{12}CO_3 \cdot 3.5H_2O$, $Mg_6Al_2(OH)_{16}CO_3 \cdot 4H_2O$, $Mg_5Al_2(OH)_{14}CO_3 \cdot 4H_2O$, $Mg_3Al_2(OH)_{10}CO_3 \cdot 1.7H_2O$, $Mg_3ZnAl_2(OH)_{12}CO_3 \cdot wH_2O$, and $Mg_3ZnAl_2(OH)_{12}CO_3$. Commercially available water-containing hydrotalcites include "DHT-4A" and "DHT-6", each produced by Kyowa Chemical Industry.

As for the (c) deterioration inhibitor content in the polyamide resin composition, if it is too low, the effect of adding the (c) deterioration inhibitor cannot be produced as expected. If it is too high, the effect is not as high as the effect expected from the amount of the deterioration inhibitor added. Thus, in these cases, the gas barrier property, flexibility, aging resistance and other properties of the polyamide resin composition are disadvantageously degraded. Accordingly, the (c) deterioration inhibitor content in the polyamide resin composition is preferably 1% to 15% by weight relative to the polymer component in the polyamide resin composition, and more preferably 3% to 10% by weight.

The polymer component in the polyamide resin composition mentioned herein refers to the entirety of all polymer components including the (a) polyamide resin, the (b) polyolefin-based elastomer, and other resins that may be optionally added.

<(d) Anti-Aging Agent>

The (d) anti-aging agent contained in the polyamide resin composition of the present invention can be any of the compounds conventionally used as anti-aging agents of polyamide resin compositions, and examples thereof include organic anti-aging agents containing a phenol-based compound and a sulfur-based compound, and inorganic anti-aging agents such as copper iodide, potassium iodide and other iodides. These compounds may be used singly or combination. In particular, from the viewpoint of imparting a high heat resistance to the polyamide resin composition so that it can withstand high temperature and high pressure conditions as the polyamide resin composition of the gas barrier layer of a refrigerant transporting hose, an iodide, particularly, copper iodide or potassium iodide, is preferably used.

In particular, it is preferable that copper iodide and potassium iodide be used in combination as the iodide, and that the weight ratio [copper iodide]/[potassium iodide] in this instance be 1/0.5 to 1/10, particularly 1/1 to 1/8, more particularly 1/2 to 1/6. Such a combined use of copper iodide and potassium iodide leads to further enhanced heat resistance.

As for the (d) anti-aging agent content in the polyamide resin composition, if it is too low, the effect of adding the (d) anti-aging agent cannot be produced as expected. If it is too high, the effect is not as high as the effect expected from the amount of the anti-aging agent added, and costs are increased. Accordingly, the (d) anti-aging agent content in the polyamide resin composition is preferably set to 0.01% to 1% by weight, preferably 0.1% to 0.8% by weight, relative to the polymer component in the polyamide resin composition.

<Other Components>

The polyamide resin composition of the present invention may further contain resin components other than the polyamide resin. In this instance, however, it is preferable that the polyamide resin accounts for 70% by weight or more of the entirety of all polymer components in the refrigerant transporting hose, from the viewpoint of ensuring a gas barrier property.

An example of such other resin components may be ethylene-vinyl alcohol resin.

Also, the polyamide resin composition of the present invention may further contain other additives, such as a lubricant, an anti-static agent, an antioxidant, a coloring agent, a crystal nucleating agent, a filler, a reinforcing agent, a heat resisting agent, and a light-resisting agent.

<Method for Producing Polyamide Resin Composition>

In the present invention, for producing the polyamide resin composition, the following three steps are performed: a (c) deterioration inhibitor and a (b) polyolefin-based elastomer are mixed and kneaded (mixing and kneading step (A)); an (a) polyamide resin and a (d) anti-aging agent are mixed and kneaded (mixing and kneading step (B)); and the mixture prepared in the mixing and kneading step (A) and the mixture prepared in the mixing and kneading step (B) are mixed and kneaded to prepare a polymer alloy (mixing and kneading step (C)).

The heating temperature in the mixing and kneading step (A) is preferably set, rather low, to the extent that the elastomer can flow so as to prevent the deterioration of the elastomer by heat. Although the heating temperature depends on the (b) polyolefin-based elastomer, it can be about 150 to 230° C., for example, for TAFMER A-1050S used in Examples described later.

Since it is preferable, in the present invention, that an (a) polyamide resin and a (d) anti-aging agent be mixed subsequent to the mixing and kneading operation of a (b) polyolefin-based elastomer and a (c) deterioration inhibitor, this mixing and kneading operation is preferably performed with heating at a higher temperature than the melting point of the (a) polyamide resin, for example, about 10 to 60° C. higher than the melting point of the (a) polyamide resin, and at which the elastomer can flow without deterioration by heat.

This mixing and kneading operation is performed to the extent that the (c) deterioration inhibitor can be sufficiently dispersed in the (b) polyolefin-based elastomer, and the mixing and kneading time and other conditions are not particularly limited.

On the other hand, the heating temperature in the mixing and kneading step (B) is preferably set to a temperature higher than or equal to the melting point of the (a) polyamide resin, for example, a temperature about 10 to 60° C. higher than the melting point of the (a) polyamide resin.

This mixing and kneading operation is performed to the extent that the (d) anti-aging agent can be sufficiently dispersed in the (a) polyamide resin, and the mixing and kneading time and other conditions are not particularly limited.

The mixing and kneading step (C) of mixing and kneading the mixture prepared in the mixing and kneading step (A) and the mixture prepared in the mixing and kneading step (B) can be performed under the same conditions as the mixing and kneading step (B).

In the present invention, only a part of the polyolefin-based elastomer used for producing the composition may be mixed in the mixing and kneading step (A), and the rest of the polyolefin-based elastomer is mixed and kneaded in the mixing and kneading step (C). However, from the viewpoint of uniformly dispersing the (c) deterioration inhibitor, it is preferable that at least 70% by weight, more preferably the entirety, of the polyolefin-based elastomer be mixed with the (c) deterioration inhibitor in the mixing and kneading step (A), as described above. For the same reason, it is preferable that at least 70% by weight, more preferably the entirety, of the polyamide resin used for producing the composition be added and kneaded in the mixing and kneading step (B) without mixing the (a) polyamide resin in the mixing and kneading step (A).

For adding one or more of the above-described other components that can be optionally added to the polyamide resin composition, these components may be added and kneaded in any step of the mixing and kneading step (A), the mixing and kneading step (B), and the mixing and kneading step (C).

A portion of a masterbatch previously prepared by mixing and kneading the (b) polyolefin-based elastomer and the (c) deterioration inhibitor and a portion of a masterbatch previously prepared by mixing and kneading the (a) polyamide resin and the (d) anti-aging agent may be mixed and kneaded. However, it is more efficient that the operation of mixing and kneading the (b) polyolefin-based elastomer and the (c) deterioration inhibitor and the operation of mixing and kneading the (a) polyamide resin and the (d) anti-aging agent are followed by the operation of mixing and kneading these mixtures.

[Refrigerant Transporting Hose]

Figure 1:
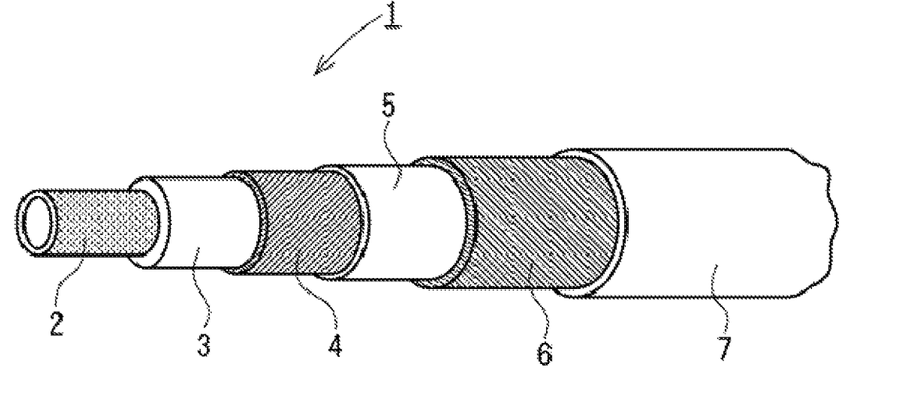
FIG. 1 is a perspective view showing a refrigerant transporting hose according to the present invention.

A refrigerant transporting hose of the present invention including a gas barrier layer made of the polyamide resin composition of the present invention prepared by the above-described method of the present invention will now be described with reference to the drawing.

FIG. 1 is a perspective view illustrating the structure of the layers of a refrigerant transporting hose 1 according to an embodiment. The innermost layer of the refrigerant transporting hose 1 is defined by a gas barrier layer 2 made of the polyamide resin composition of the present invention. On the outer periphery of the gas barrier layer 2, an inner rubber layer 3 is disposed, and then a first reinforcing yarn layer 4, an intermediate rubber layer 5, a second reinforcing yarn layer 6, and a rubber sheath layer 7 are formed in that order. The inner diameter of the hose 1 is generally 6 to 20 mm, and is particularly about 8 to 19 mm.

The material or the like of each layer will be described below.

<Gas Barrier Layer>

The gas barrier layer 2 is made of the polyamide resin composition of the present invention.

The gas barrier layer 2 made of the polyamide resin composition is preferably thicker in view of the gas barrier property. However, as the thickness increases, the flexibility of the hose is reduced.

Accordingly, the thickness of the gas barrier layer 2 is preferably 50 to 400 μm, and is particularly 100 to 300 μm.

The refrigerant transporting hose of the present invention may further include an inner rubber layer as the innermost layer on the inner side of the gas barrier layer 2 in the structure of the refrigerant transforming hose 1 shown in FIG. 1.

Other components of the refrigerant transporting hose of the present invention are not particularly limited, and the hose may have a structure of a typical refrigerant transporting hose, as will be described below.

<Inner Rubber Layer 3, Rubber Sheath Layer 7, and Intermediate Rubber Layer 5>

Rubbers that can be used for the inner rubber layer 3 and the rubber sheath layer 7 include, generally, butyl rubber (IIR), chlorinated butyl rubber (Cl-IIR), chloropolyethylene, chlorosulfonylpolyethylene, brominated butyl rubber (Br-IIR), isobutylene-bromo p-methylstyrene copolymer, EPR (ethylene-propylene copolymer), EPDM (ethylene-propylene-diene ternary copolymer), NBR (acrylonitrile butadiene rubber), CR (chloroprene rubber), hydrogenated NBR, acrylic rubber, ethylene-acrylic rubber (AEM), mixtures containing two or more of these rubbers, and mixtures containing polymers mainly made of these rubbers. Butyl rubber or EPDM rubber is advantageously used. These rubbers may contain a filler, a processing aid, an anti-aging agent, a vulcanizing agent or a vulcanization accelerator according to a conventional formula.

The rubbers of the inner rubber layer 3 and the outer sheath layer 7 may be the same or different.

The intermediate rubber layer 5 may be made of a rubber having good adhesion to the inner rubber layer 3 and the sheath layer 7 without being otherwise limited.

The thickness of the inner rubber layer 3 is preferably about 0.5 to 4 mm in view of flexibility. Preferably, the thickness of the intermediate rubber layer 5 is about 0.1 to 0.6 mm, and the thickness of the sheath layer 7 is about 0.5 to 2 mm.

<Reinforcing Yarn Layers 4 and 6>

The first reinforcing yarn layer 4 is formed by winding a reinforcing yarn in a spiral manner, and the second reinforcing yarn layer 6 is formed by winding a reinforcing yarn in a spiral manner in the opposite direction to the first reinforcing yarn layer 4.

Generally used materials can be used for the reinforcing yarn without particular limitation. In general, polyester, fully aromatic polyester, nylon, vinylon, rayon, aramid, polyacrylate, and polyethylene naphthalate can be used, and strands of these materials may be used.

<Method for Manufacturing Refrigerant Transporting Hose>

The refrigerant transporting hose of the present invention can be manufactured according to an ordinary process, by extruding the materials of the gas barrier layer 2 and the inner rubber layer 3 to predetermined thicknesses on a mandrel to form a layered structure, winding the reinforcing yarn layer 4 around the layered structure, forming the intermediate rubber layer 5 by extrusion, winding the reinforcing yarn layer 6 around the underlying layer, and then forming the rubber sheath layer 7 by extrusion. The resulting structure is vulcanized at 140 to 170° C. for 30 to 120 minutes.

EXAMPLES

The present invention will be further described in detail with reference to Examples and Comparative Examples.

Examples 1 to 35, Comparative Examples 1 to 4

Materials were mixed and kneaded according to the compositions shown in Tables 1 to 6 and the procedures shown in Tables 1 to 6 to prepare polyamide resin compositions.

The materials were mixed and kneaded at a temperature of 230° C., higher than or equal to the melting point (220° C.) of the polyamide resin, using a twin screw kneader manufactured by Toyo Seiki. The mixing and kneading operation was performed by one of the following mixing and kneading procedures I to III.

<Mixing and Kneading Procedure>

The mixing and kneading operation was performed one of the following procedures 1) to 3).

1) Kneading each of a mixture of an elastomer and a deterioration inhibitor and a mixture of nylon and an anti-aging agent, and then mixing and kneading the elastomer containing the deterioration inhibitor and the nylon containing the anti-aging agent.

2) Mixing and kneading an elastomer and a deterioration inhibitor, and then mixing and kneading the elastomer containing the deterioration inhibitor, and nylon and an anti-aging agent.

3) Mixing and kneading all the materials at one time.

The materials used in the preparation of the polyamide resin compositions were as follows:

Polyamide 6: nylon 6 "1022B" produced by Ube Industries

Elastomer: α-olefin polymer (ethylene-butene copolymer) "TAFMER A-1050S" produced by Mitsui Chemicals Maleic Acid-Modified Elastomer: maleic acid-modified α-olefin polymer (ethylene-butene copolymer) "TAFMER MH-7010" produced by Mitsui Chemicals Hydrotalcite A: "Hydrotalcite DHT-4A" produced by Kyowa Chemical Composition Formula:  $Mg_{4.5}Al_2(OH)_{13}CO_3 \cdot 3.5H_2O$ Copper Iodide: "Copper Iodide" produced by Yanagishima Seiyaku K. K.

Potassium Iodide: "Potassium Iodide" produced by Yanagishima Seiyaku K. K.

Hydrotalcite: "HDT-4A-2" produced by Kyowa Chemical

Magnesium oxide: "Kyowamagu #30" produced by Kyowa Chemical

Zinc Oxide: "No. 3 Hydrozincite" produced by Hakusui Tech

Calcium Hydroxide: "CLS-B" produced by Shiraishi Kogyo

Magnesium Hydroxide: "Kyowasuimagu" produced by Kyowa Chemical

Aluminum Hydroxide: "HIGILITE H31" produced by Showa Denko

Calcium Oxide: "CML #35" produced by Ohmi Chemical Industry

Aluminum Oxide: "KC-501" produced by Sumitomo Chemical

Calcium Carbonate: "Calcium Fine 200M" produced by Maruo Calcium

Magnesium Carbonate: "TT" produced by Tokuyama

Amorphous Silica: "Nipsil AQ" produced by Tosoh Silica Corporation

Porous Silica: "Fine Seal" produced by Tokuyama

Calcium Silicate: "ZONO-HIGE" produced by Ube Material Industries

Magnesium Silicate: "Mistron Vapor" produced by Nihon Mistron

The resulting polyamide resin test samples were subjected to evaluation for properties in the following methods, and the results are shown in Tables 1 to 6.

<Dispersibility of Elastomer>

The polyamide resin test samples surface-treated with phosphotungstic acid were observed to examine the particle size of the dispersed particles of the elastomer through an electron microscopy (SEM). When the particle size of dispersed particles was 3 μm or less, the dispersibility was determined to be good, and when it was larger than 3 μm, the dispersibility was determined to be NG.

<Retention Factor of Strength after Aging>

Each polyamide resin test sample after the aging test described below was measured for breaking strength in a state where it was elongated at a tension rate of 50 mm/min, using a tensile tester manufactured by Toyo Seiki. The values after the aging test are represented as percentage to the value before the aging test.

<Retention Factor of Breaking Elongation after Aging>

Each polyamide resin test sample after the aging test described below was measured for breaking elongation in a state where it was elongated at a tension rate of 50 mm/min, using a tensile tester manufactured by Toyo Seiki. The values after the aging test are represented as percentage to the value before the aging test.

<Aging Test>

An aging test was performed in the following order of i) to vii).

i) Charge a pressure-resistant vessel with 1 cc of water.

ii) Place a polyamide resin test sample of 10 in width by 50 mm in length by 0.1 mm in thickness in the vessel.

iii) Place 70 cc of polyalkylene glycol oil in the vessel.

vi) After freezing the pressure-resistant vessel for 15 minutes, evacuate the pressure-resistant vessel for 5 minutes.

v) Place 70 cc of a refrigerant R-134a in the vessel.

vi) Allow the vessel to stand at 150° C. in a high-temperature bath for 4 weeks.

vii) Take the polyamide resin test sample from the vessel and perform measurements for evaluation.

<Retention Factor of Strength after Heat Aging>

Each polyamide resin test sample after a heat aging resistance test, in which the samples were allowed to stand at 150° C. in a high-temperature bath for one week, was measured for breaking strength in a state where it was elongated at a tension rate of 50 mm/min, using a tensile tester manufactured by Toyo Seiki. The values after the heat aging resistance test are represented as percentage to the value before the heat aging resistance test.

<Retention Factor of Breaking Elongation after Heat Aging>

Each polyamide resin test sample after a heat aging resistance test, in which the samples were allowed to stand at 150° C. in a high-temperature bath for one week, was measured for breaking elongation in a state where it was elongated at a tension rate of 50 mm/min, using a tensile tester manufactured by Toyo Seiki. The values after the heat aging resistance test are represented as percentage to the value before the heat aging resistance test.

<Surface Roughness>

Using a "surface roughness tester Surf Coder SE-2300" manufactured by Kosaka Laboratory, the center line average surface roughness was measured in accordance with JIS B0601.

TABLE 1

| | | Example 1 | Example 2 | Example 3 | Example 4 | Comparative Example 1 | Comparative Example 2 | Comparative Example 3 | Comparative Example 4 | Example 5 |
|---|---|---|---|---|---|---|---|---|---|---|
| Constituents and contents (parts by weight) in polyamide resin composition | Polyamide 6 | 70 | 70 | 70 | 70 | 70 | 70 | 70 | 70 | 70 |
| | Elastomer | 15 | 15 | 15 | 15 | 15 | 15 | 15 | 15 | 15 |
| | Maleic acid-modified elastomer | 15 | 15 | 15 | 15 | 15 | 15 | 15 | 15 | 15 |
| | Hydrotalcite A | 5 | 5 | 5 | 15 | — | — | 5 | 5 | 5 |
| | Copper iodide | 0.01 | 0.1 | 0.2 | 0.2 | — | 0.1 | — | 0.1 | 0.3 |
| | Potassium iodide | — | 0.4 | 0.8 | 0.8 | — | 0.4 | — | 0.4 | 1.2 |
| Mixing procedure | | I | I | I | I | III | III | II | II | I |
| Evaluation Results | Retention factor of strength after aging | 64 | 67 | 71 | 86 | 0 | 0 | 62 | 64 | 72 |
| | Retention factor of breaking elongation after aging | 58 | 63 | 68 | 82 | 0 | 0 | 59 | 60 | 68 |
| | Retention factor of strength after heat aging | 32 | 74 | 79 | 82 | 12 | 81 | 11 | 31 | 78 |
| | Retention factor of breaking elongation after heat aging | 24 | 66 | 71 | 78 | 8 | 75 | 6 | 16 | 72 |
| | Elastomer dispersibility | Good | Good | Good | Good | Good | Good | Good | Good | Good |
| | Surface roughness Ra (μm) | 0.34 | 0.35 | 0.36 | 0.72 | 0.008 | 0.01 | 0.36 | 0.36 | 0.37 |

TABLE 2

| | | Example 6 | Example 7 | Example 8 | Example 9 | Example 10 |
|---|---|---|---|---|---|---|
| Constituents and contents (parts by weight) in polyamide resin composition | Polyamide 6 | 70 | 70 | 70 | 70 | 70 |
| | Elastomer | 15 | 15 | 15 | 15 | 15 |
| | Maleic acid-modified elastomer | 15 | 15 | 15 | 15 | 15 |
| | Hydrotalcite | 5 | 5 | 5 | 5 | 1 |
| | Copper iodide | — | 0.4 | 0.1 | 0.05 | 0.2 |
| | Potassium iodide | 0.01 | 0.4 | 0.8 | 0.5 | 0.8 |
| Mixing procedure | | I | I | I | I | I |
| Evaluation Results | Retention factor of strength after aging | 66 | 67 | 68 | 68 | 66 |
| | Retention factor of breaking elongation after aging | 64 | 63 | 65 | 64 | 61 |
| | Retention factor of strength after heat aging | 53 | 74 | 75 | 72 | 78 |
| | Retention factor of breaking elongation after heat aging | 41 | 67 | 66 | 64 | 70 |
| | Elastomer dispersibility | Good | Good | Good | Good | Good |
| | Surface roughness Ra (μm) | 0.35 | 0.36 | 0.35 | 0.35 | 0.21 |

TABLE 3

| | | Example 11 | Example 12 | Example 13 | Example 14 |
|---|---|---|---|---|---|
| Constituents and contents (parts by weight) in polyamide resin composition | Polyamide 6 | 70 | 70 | 70 | 70 |
| | Elastomer | 15 | 15 | 15 | 15 |
| | Maleic acid-modified elastomer | 15 | 15 | 15 | 15 |
| | Amorphous silica | 5 | | | |
| | Porous silica | | 5 | | |
| | Calcium silicate | | | 5 | |
| | Magnesium silicate | | | | 5 |
| | Copper iodide | 0.2 | 0.2 | 0.2 | 0.2 |
| | Potassium iodide | 0.8 | 0.8 | 0.8 | 0.8 |

TABLE 3-continued

|  |  | Example 11 | Example 12 | Example 13 | Example 14 |
|---|---|---|---|---|---|
| Mixing procedure | | I | I | I | I |
| Evaluation Results | Retention factor of strength after aging | 66 | 67 | 66 | 65 |
| | Retention factor of breaking elongation after aging | 64 | 63 | 61 | 60 |
| | Retention factor of strength after heat aging | 72 | 70 | 68 | 67 |
| | Retention factor of breaking elongation after heat aging | 66 | 64 | 63 | 61 |
| | Elastomer dispersibility | Good | Good | Good | Good |
| | Surface roughness Ra(μm) | 0.41 | 0.37 | 0.38 | 0.37 |

TABLE 4

|  |  | Example 15 | Example 16 | Example 17 | Example 18 | Example 19 | Example 20 | Example 21 | Example 22 |
|---|---|---|---|---|---|---|---|---|---|
| Constituents and contents (parts by weight) in polyamide resin composition | Polyamide 6 | 70 | 70 | 70 | 70 | 70 | 70 | 70 | 70 |
| | Elastomer | 15 | 15 | 15 | 15 | 15 | 15 | 15 | 15 |
| | Maleic acid-modified elastomer | 15 | 15 | 15 | 15 | 15 | 15 | 15 | 15 |
| | Zinc oxide | 5 | | | | | | | |
| | Calcium hydroxide | | 5 | | | | | | |
| | Magnesium Hydroxide | | | 5 | | | | | |
| | Aluminum hydroxide | | | | 5 | | | | |
| | Calcium oxide | | | | | 5 | | | |
| | Aluminum oxide | | | | | | 5 | | |
| | Calcium carbonate | | | | | | | 5 | |
| | Magnesium carbonate | | | | | | | | 5 |
| | Copper iodide | 0.2 | 0.2 | 0.2 | 0.2 | 0.2 | 0.2 | 0.2 | 0.2 |
| | Potassium iodide | 0.8 | 0.8 | 0.8 | 0.8 | 0.8 | 0.8 | 0.8 | 0.8 |
| Mixing procedure | | I | I | I | I | I | I | I | I |
| Evaluation Results | Retention factor of strength after aging | 65 | 66 | 65 | 63 | 67 | 63 | 64 | 62 |
| | Retention factor of breaking elongation after aging | 62 | 63 | 61 | 61 | 63 | 61 | 61 | 61 |
| | Retention factor of strength after heat aging | 73 | 74 | 72 | 71 | 76 | 70 | 73 | 71 |
| | Retention factor of breaking elongation after heat aging | 67 | 68 | 66 | 68 | 69 | 67 | 68 | 67 |
| | Elastomer dispersibility | Good | Good | Good | Good | Good | Good | Good | Good |
| | Surface roughness Ra (μm) | 0.33 | 0.31 | 0.34 | 0.35 | 0.3 | 0.37 | 0.33 | 0.34 |

TABLE 5

|  |  | Example 23 | Example 24 | Example 25 | Example 26 | Example 27 | Example 28 |
|---|---|---|---|---|---|---|---|
| Constituents and contents (parts by weight) in polyamide resin composition | Polyamide 6 | 70 | 70 | 70 | 70 | 70 | 70 |
| | Elastomer | 15 | 15 | 15 | 15 | 15 | 15 |
| | Maleic acid-modified elastomer | 15 | 15 | 15 | 15 | 15 | 15 |
| | Hydrotalcite | 5 | 5 | 5 | 5 | 5 | 5 |
| | Zinc oxide | 5 | | | | | |
| | Calcium hydroxide | | 5 | | | | |
| | Magnesium Hydroxide | | | 5 | | | |
| | Aluminum hydroxide | | | | 5 | | |
| | Calcium oxide | | | | | 5 | |
| | Aluminum oxide | | | | | | 5 |
| | Calcium carbonate | | | | | | |
| | Magnesium carbonate | | | | | | |
| | Amorphous silica | | | | | | |
| | Porous silica | | | | | | |
| | Copper iodide | 0.2 | 0.2 | 0.2 | 0.2 | 0.2 | 0.2 |
| | Potassium iodide | 0.8 | 0.8 | 0.8 | 0.8 | 0.8 | 0.8 |

TABLE 5-continued

|  |  |  |  |  |  |  |  |
|---|---|---|---|---|---|---|---|
| Mixing procedure |  | I | I | I | I | I | I |
| Evaluation Results | Retention factor of strength after aging | 80 | 84 | 84 | 82 | 92 | 80 |
|  | Retention factor of breaking elongation after aging | 80 | 31 | 83 | 79 | 90 | 80 |
|  | Retention factor of strength after heat aging | 81 | 83 | 82 | 81 | 89 | 78 |
|  | Retention factor of breaking elongation after heat aging | 73 | 75 | 74 | 76 | 88 | 75 |
|  | Elastomer dispersibility | Good | Good | Good | Good | Good | Good |
|  | Surface roughness Ra (μm) | 0.37 | 0.36 | 0.33 | 0.33 | 0.35 | 0.36 |

|  |  | Example 29 | Example 30 | Example 31 | Example 32 | Example 33 |
|---|---|---|---|---|---|---|
| Constituents and contents (parts by weight) in polyamide resin composition | Polyamide 6 | 70 | 70 | 70 | 70 | 70 |
|  | Elastomer | 15 | 15 | 15 | 15 | 15 |
|  | Maleic acid-modified elastomer | 15 | 15 | 15 | 15 | 15 |
|  | Hydrotalcite | 5 | 5 | 5 | 5 |  |
|  | Zinc oxide |  |  |  |  |  |
|  | Calcium hydroxide |  |  |  |  |  |
|  | Magnesium Hydroxide |  |  |  |  |  |
|  | Aluminum hydroxide |  |  |  |  |  |
|  | Calcium oxide |  |  |  |  | 5 |
|  | Aluminum oxide |  |  |  |  |  |
|  | Calcium carbonate | 5 |  |  |  |  |
|  | Magnesium carbonate |  | 5 |  |  | 5 |
|  | Amorphous silica |  |  | 5 |  |  |
|  | Porous silica |  |  |  | 5 |  |
|  | Copper iodide | 0.2 | 0.2 | 0.2 | 0.2 | 0.2 |
|  | Potassium iodide | 0.8 | 0.8 | 0.8 | 0.8 | 0.8 |
| Mixing procedure |  | I | I | I | I | I |
| Evaluation Results | Retention factor of strength after aging | 81 | 84 | 78 | 77 | 69 |
|  | Retention factor of breaking elongation after aging | 80 | 86 | 76 | 77 | 68 |
|  | Retention factor of strength after heat aging | 79 | 81 | 76 | 74 | 75 |
|  | Retention factor of breaking elongation after heat aging | 76 | 80 | 72 | 73 | 68 |
|  | Elastomer dispersibility | Good | Good | Good | Good | Good |
|  | Surface roughness Ra (μm) | 0.31 | 0.33 | 0.39 | 0.41 | 0.38 |

TABLE 6

|  |  | Example 34 | Example 35 |
|---|---|---|---|
| Constituents and contents (parts by weight) in polyamide resin composition | Polyamide 6 | 70 | 70 |
|  | Elastomer | 15 | 15 |
|  | Maleic acid-modified elastomer | 15 | 15 |
|  | Hydrotalcite | 5 |  |
|  | Magnesium oxide | 5 | 5 |
|  | Copper iodide | 0.2 | 0.2 |
|  | Potassium iodide | 0.8 | 0.8 |
| Mixing procedure |  | I | I |
| Evaluation Results | Retention factor of strength after aging | 73 | 70 |
|  | Retention factor of breaking elongation after aging | 71 | 67 |
|  | Retention factor of strength after heat aging | 77 | 76 |
|  | Retention factor of breaking elongation after heat aging | 70 | 67 |
|  | Elastomer dispersibility | Good | Good |
|  | Surface roughness Ra (μm) | 0.33 | 0.31 |

While the present invention has been described with reference to specific embodiments, it is to be understood by those skilled in the art that various modifications may be made without departing from the intention and scope of the invention.

The present application is based on a Japanese patent application (Japanese patent application 2011-036128) filed on Feb. 22, 2011, the entirety of which is incorporated herein by reference.

The invention claimed is:

1. A method for producing a polyamide resin composition containing an (a) polyamide resin, a (b) polyolefin-based elastomer, and at least one (c) deterioration inhibitor selected from the group consisting of hydroxides, oxides and divalent or trivalent metals, and silica-based inorganic compounds, and a (d) anti-aging agent, the method comprising:

a mixing and kneading step (A) of mixing and kneading the (c) deterioration inhibitor and the (b) polyolefin-based elastomer without the (a) polyamide resin and the (d) anti-aging agent;

a mixing and kneading step (B) of mixing and kneading the (a) polyamide resin and the (d) anti-aging agent without the (c) deterioration inhibitor and the (b) polyolefin-based elastomer; and a mixing and kneading step (C) of mixing and kneading the mixture prepared in the mixing and kneading step (A) and the mixture prepared in the mixing and kneading step (B), wherein the proportion of the (d) anti-aging agent is 0.01% to 1% by weight relative to the polymer component in the polyamide resin composition;

the (b) polyolefin-based elastomer content in the polyamide resin composition is 10% to 45% by weight relative to the total weight of the polyamide resin composition and at least part of the (b) polyolefin-based elastomer is modified with an acid;

the proportion of the (c) deterioration inhibitor is 1% to 15% by weight relative to the polymer component in the polyamide resin composition; and the (d) anti-aging agent contains copper iodide and potassium iodide.

2. The method for producing a polyamide resin composition according to claim 1, wherein the (c) deterioration inhibitor is hydrotalcite.

3. The method for producing a polyamide resin composition according to claim 1, wherein the (a) polyamide resin is polyamide 6.

4. The method for producing a polyamide resin composition according to claim 1, wherein the (b) polyolefin-based elastomer content in the polyamide resin composition is 20% to 40% by weight relative to the total weight of the polyamide resin composition.

5. The method for producing a polyamide resin composition according to claim 1, wherein the content of the (b) polyolefin-based elastomer modified with an acid is 40% to 100% by weight of the (b) polyolefin-based elastomer in the polyamide resin composition.

6. The method for producing a polyamide resin composition according to claim 1, wherein the polyamide resin composition is measured for breaking elongation in a state where the polyamide resin composition is elongated at a tension rate of 50 mm/min, using a tensile tester both before and after a heat aging test at 150° C. in a high-temperature bath for 4 weeks, and a retention factor representing the breaking elongation after the heat aging test as a percentage of the elongation breaking before the heat aging test is 61 or greater.

* * * * *